United States Patent [19]

Dorman et al.

[11] Patent Number: 4,674,882
[45] Date of Patent: Jun. 23, 1987

[54] PRECISION OPTICAL DISPLACEMENT MEASURING INSTRUMENT USING SERVO CONTROLLED FIBER OPTIC SENSOR

[75] Inventors: Richard A. Dorman, Troy; Curtis D. Kissinger, Gloversville; Leo Hoogenboom, Ballston Spa; Gregory Hull-Allen, Schenectady; Samuel Fallek, Voorheesville, all of N.Y.

[73] Assignee: Mechanical Technology Incorporated, Latham, N.Y.

[21] Appl. No.: 709,582

[22] Filed: Mar. 8, 1985

[51] Int. Cl.4 .............................................. G01B 11/14
[52] U.S. Cl. .................................... 356/373; 250/201; 356/4; 356/375
[58] Field of Search ........................... 356/4, 373, 375; 250/201, 201 AF, 201, PF, 201 DF, 202, 203 R, 227; 369/43, 45

[56] References Cited

U.S. PATENT DOCUMENTS 3,940,608  2/1976  Kissinger et al. .................... 250/227
3,952,191  4/1976  Tinet ................................. 369/45 X Primary Examiner—F. L. Evans
Attorney, Agent, or Firm—Joseph V. Claeys; Joseph C. Sullivan

[57] ABSTRACT

A displacement measuring instrument for measuring the displacement of a target including in combination a fiber optic lens assembly including means for maintaining said assembly in space relation with said target, dither means for vibrating said assembly toward and away from said target about the lens null along the axis of said assembly, first electronic means for providing a first output voltage proportional to displacement of said assembly from said target, second electronic means cancelling that portion of said first output voltage resulting from displacement due to said dither means and providing a second voltage resulting from displacement due to means other than said dither means, servo means receiving said second output voltage and moving said assembly with respect to said target to null said second output voltage and measurement means measuring the movement of said servo means.

1 Claim, 5 Drawing Figures

PRECISION OPTICAL DISPLACEMENT MEASURING INSTRUMENT USING SERVO CONTROLLED FIBER OPTIC SENSOR

FIELD OF THE INVENTION

The present invention relates to a proximity instrument and more particularly, to a fiber optic sensor with extender lens and servo positioning system.

BACKGROUND OF THE INVENTION

The use of fiber optic proximity probes utilizing bifurcated fiber optic bundles and sensors and detectors to determine the distance to a target are well known. Such devices utilize a light beam transmitted from a light source by way of a bundle of light conducting optical fibers (transmit fibers) from a light source to a target. The light is reflected off the target and returned along other optical fibers (receive fibers) in the bundle back to a light intensity sensor. The intensity of the returned light is a function of the distance between the proximity probe tip and the target, so the output of the light sensor can be a very precise measure of that distance, or more importantly changes in that distance. Such a system is shown and described in U.S. Pat. No. 3,940,608 in which an extender lens is utilized.

SUMMARY OF THE INVENTION

The concept of the optical null that exists with the fiber optic sensor with the lens as described in the aforemention U.S. Pat. No. 3,940,608, is utilized in the present disclosure which presents an electro-mechanical system which will enable the probe to lock onto the null point and remain in focus and follow the target. If the target moves toward or away from the probe, the entire sensor assembly will move in the same direction and stay in a focus lock condition. By measuring the movement of the probe, movement of the surface can be determined.

The device is a noncontacting instrument which uses the principles of fiber optics to perform displacement and surface profile measurements. The sensor transmits a beam of light through a flexible fiber optic probe, receives the light reflected from the target surface, and converts it into an electrical signal proportional to the gap displacement between the probe tip and the target surface. This signal voltage is then used to generate a calibration curve which graphically displays the instrument response and compares the amount of reflected light to the amount of displacement between the probe and target surface.

When the probe is mounted very close to the target, the amount of reflected light seen by the receiving fibers is small. However, as the target moves further away from the probe, the amount of light seen by the receiving fibers increases rapidly. Even small target movements occurring in this range cause a significant increase in the reflected light and therefore a sharp increase in the voltage output. By plotting a curve which represents voltage output as compared to mils of displacement between the target and the probe, a steep curve incline occurs in this range. Further movement of the target from the probe causes the illuminated area to enlarge, increasing the amount of reflected light seen by the receiving fibers. Eventually, the receiving fibers are accepting the maximum amount of light for their dimension. At this point, the maximum amount of reflected light is being transmitted to the sensor and consequently the maximum voltage output is being generated by the instrument. The calibration curve then reaches the optical peak.

The optical peak provides the output signal sensitivity to light intensity variations required for inspection and comparison of surface conditions. The optical peak can also be used to calibrate each probe to establish standard sensitivity independent of target reflectance. As the calibration reference point, the optical peak can be used to adjust transmitted light intensity, such that the reflected light intensity remains at the same independent of target reflectance.

If the target reflectance is either too high or too low, as compared to the calibrated curve, the user can adjust the transmitted light intensity to set the reflected light to the calibrated curve response level.

Further target movement away from the probe causes a loss of reflected light intensity seen by the receiving fiber. This causes a decrease in the voltage output generated by the instrument.

The lens allows the probe to operate at greater standoff distances by focusing the light beyond the front of the lens. When the distance from the front of the lens to the reflecting target is approximately the same as the focal length, an image of the probe face will appear on the surface of the reflective target. This image is then transmitted back through the lens and is reimaged onto the probe face. Therefore, the returning light enters the fibers it originated from, and the receive fibers receive little light. This causes a sharp null to occur in the instrument's output signal.

When the target distance is displaced slightly in either direction from the focal point, the image is blurred and the returning light begins to enter the signal fibers. This action generates an increase in output signal at either side of the null.

DESCRIPTION OF THE PREFERRED EMBODIMENT

Figure 3:
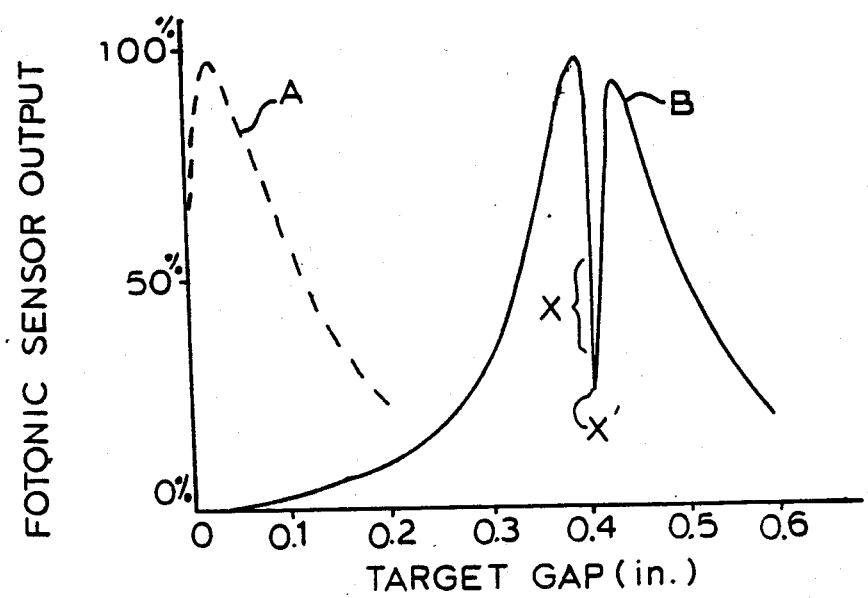
FIG. 3 is a graphical representation of the operation of the device.
Figure 4:
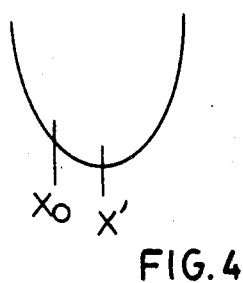
FIG. 4 is an enlarged sectional view of the zone of the curve shown in FIG. 3 in the area of X'.

The proximity instrument utilizes a probe composed of a fiber optic sensor and a lens such as that described in U.S. Pat. No. 3,940,608 with an output signal which is illustrated in FIG. 3. The fiber optic sensor lens assembly is identified by the numerals 1 and 2 in FIG. 1. The sensor and lens combination has a response curve similar to that shown in FIGS. 3 and 4 which illustrate the change in the probe output signal with movement of the probe toward and away from the target. The sensor 1 and the lens 2 are coupled together so that a single mechanical structure results. The numeral 2' identifies the target.

In this invention the fiber optic sensor and lens assembly are vibrated in the direction of the probe axis, toward and away from the target. This is referred to as a dither. Vibration is accomplished by providing a mechanical structure 6' and an electromagnetic driver 5. An AC signal is applied to transducer 5 and it provides a magnetic force to member 4' and forces the assembly to vibrate. Structural support 6' is the mechanical ground or reference or mechanical reference point. Spring means or flexure 7' allows the probe assembly to flex. The typical dither frequency is 100 Hz although it could be in the range from 10 Hz to 1000 Hz. This is typical but the frequency can be any reasonable selected frequency. The vibration amplitude is typically on the order of about 10 μm maximum.

Observing the response curve shown in FIG. 3 and labelled B, it is noted that the system works around the point of the null X'. When a dither is applied, the probe is actually oscillating back and forth around the null point X'. The fiber optic sensor electronics 7 provides an output voltage proportional to the displacement squared. The output voltage is an AC signal caused by the dither motion. That AC signal will be twice the frequency of the dither. For example, if the system is off the null and was operating in the region X, a one-to-one relationship between the dither and the output is obtained and they would be the same frequency. However, dithering about the point X' as the mechanical dither goes negative away from X', the signal rises and as the mechanical dither goes positive away from X', it also goes positive. By virtue of operating on null, going up on both sides, the output is twice the frequency.

Curve A in FIG. 3 is provided for comparison and is the curve achieved by a fiber optic sensor without an optic lens as explained in the before identified U.S. Pat. No. 3,940,608. Numerals 7 and 11 in FIGS. 1 and 2 identify the electronics. Sensor 1 with associated electronics 7 and 11 provide a standard fiber optic sensor system. The optic signals are indicated as entering 7, 11 from the left in FIG. 1 and exiting as electrical signals. Electronics 7 is the standard fiber optic sensor electronics, the function of which is to convert the light output of electrical signals, somewhat similar to the teaching in U.S. Pat. No. 3,940,608, and electronics 11 is signal conditioning electronics added to amplify the AC dither signal.

The electronics 7, 11 provides an electrical output that allows for the obtaining of a measurable signal as shown in the FIG. 3. Whenever the target to probe distance changes, the electrical output of 7, 11 follows the curve B in FIG. 3. If the assembly is in the off-the-null condition at $X_O$, namely out of focus—and then dithered at that point, an output containing a component synchronous with the dither frequency appears at 7, 11 output. However, beginning to dither at X', in focus, because the transfer function reverses direction, the electrical output at 7, 11 will be twice the frequency of the dither and there will be no component synchronous with the dither frequency.

Figure 1:
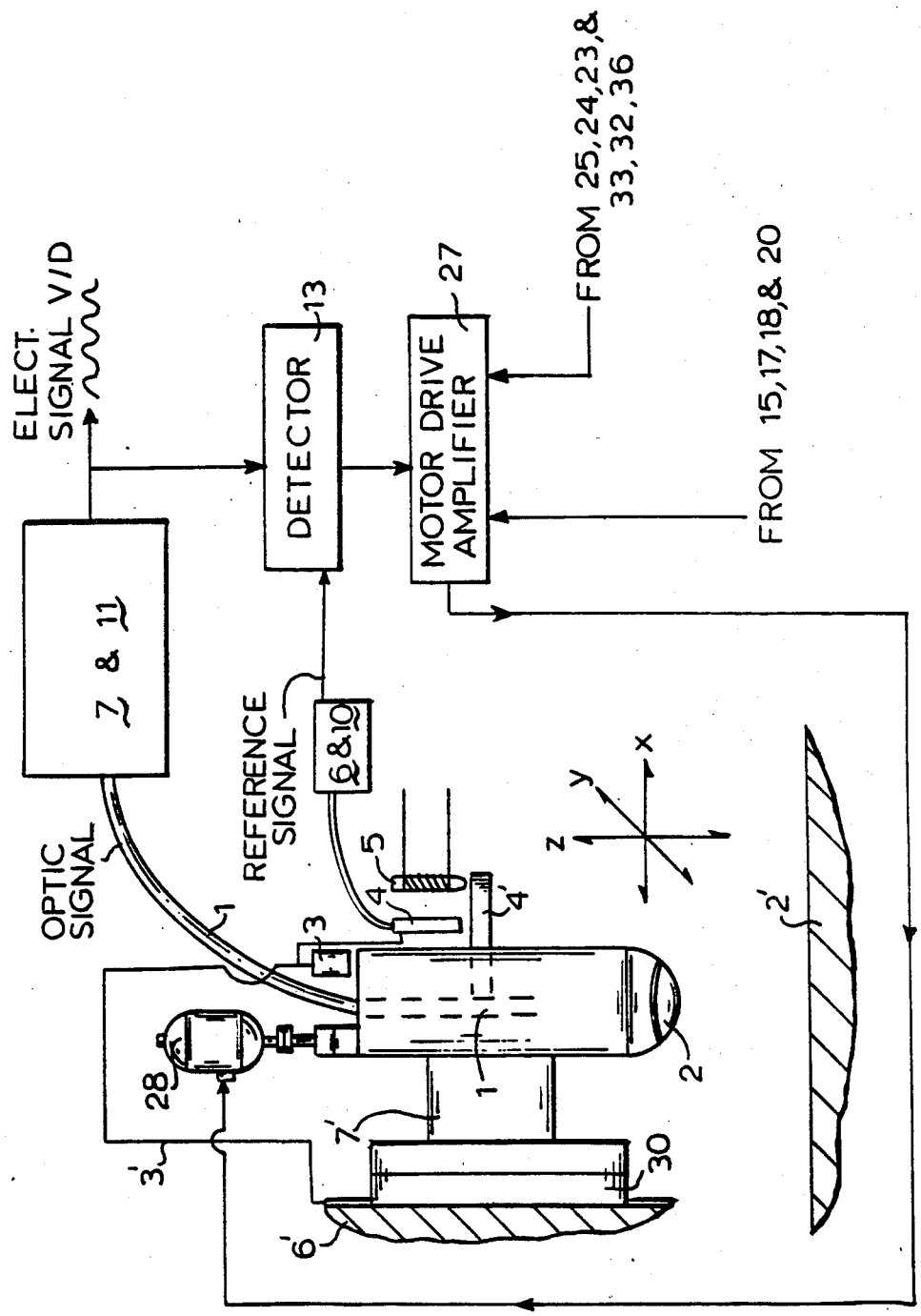
FIG. 1 is a simplified diagrammatic illustration of a proximity instrument incorporating the present invention.

An error detection circuit 13 is shown in FIG. 1 at the output of 7, 11. When starting-up in focus and dithering, the output of 7, 11 is twice the frequency of the dither signal. If the target to probe distance changes slightly, there occurs an out of focus condition. The output of 7, 11 will still contain a signal which is twice the frequency of the dither but it will also begin to show a component, which is the same frequency as the dither, as the central point of the dither signal moves to one side of X'—the null point. A combination of signals results. The function of the error detection circuit 13 is to measure the amplitude of that fundamental signal, which is the frequency of the dither. That same frequency component is the fundamental and the fundamental frequency is the dither frequency. The function of 13 is to detect the value of fundamental in the output at 7, 11. Dither amplitude sensor 4 and electronics 6 and 10 produce an AC signal proportional to and synchronous with the fundamental probe motion. This fundamental probe motion signal is a reference signal to detector 13. When the probe is in focus, the output of the detector 13 is zero. As it begins to go out of focus on either side, the output of the detector increases. The output of detector 13 has polarity such that the direction in which the target moves toward or away from the probe can be determined. The detector 13 is configured so as to measure only fundamental; accordingly any other signals may be filtered out. Essentially, detector 13 provides an output which signifies amount or distance out of focus and in which direction.

The output of detector 13 drives the motor 28 through motor drive amplifier 27 which moves the probe back to the null position thus closing the "loop" of the servo system. This brings the probe and lens into focus. Thus a servo system is provided which will position the probe to always be a fixed distance from target and essentially stay locked in focus.

Means are provided to measure the movement of the probe necessary to bring it back into focus. Displacement sensor 3 is provided which is mechanically referenced by means 3' to mechanical frame of reference or mechanical ground 6'. This prevents sensor 3 from having introduced into it, the movement of the dither or the movement of the probe. Sensor 3 can be for example, a displacement sensor such as an LVTD.

Figure 2A:
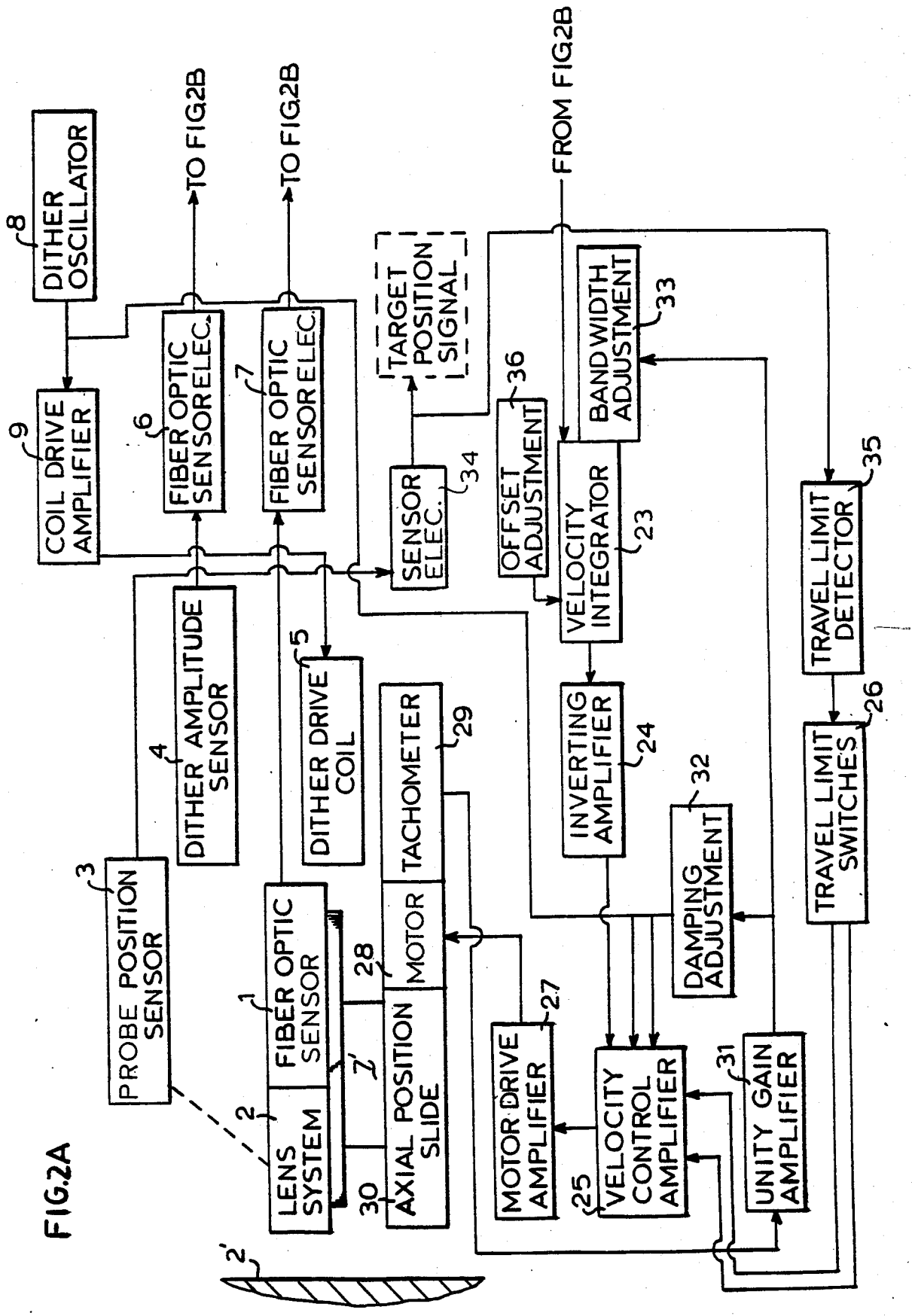
FIGS. 2A, 2B is a more detailed diagrammatic illustration of the instrument shown in FIG. 1.
Figure 2B:
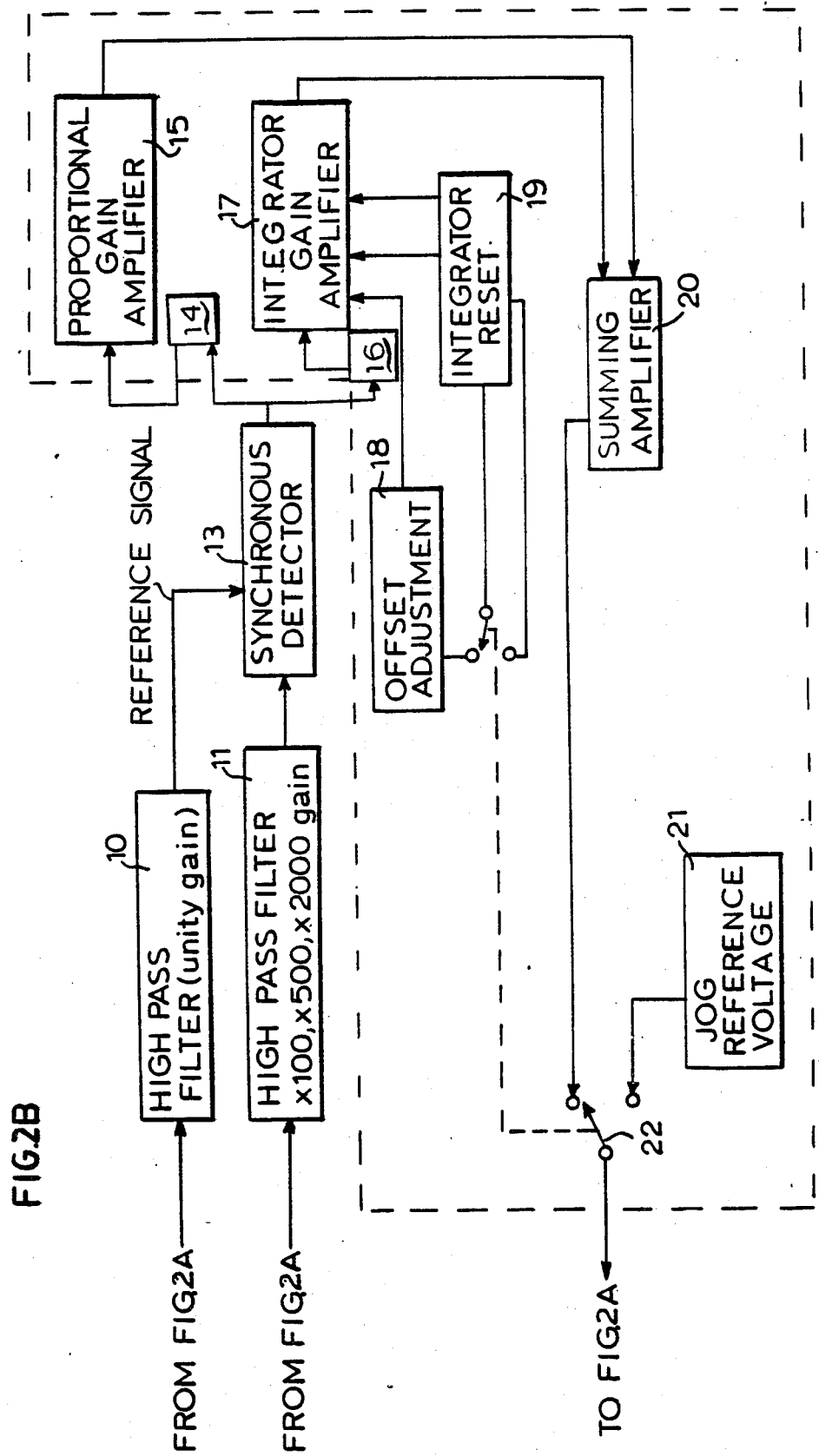

FIGS. 2A, 2B provide a more detailed overall view of the system shown in FIG. 1. The numerals used to identify components in FIGS. 2A, 2B are the same used to identify similar components in FIG. 1. Thus, numeral 1 is the fiber optic sensor; numeral 2 is the lens system. Components 7 and 11 shown in FIGS. 2A, 2B collectively convert the optical signal from the probe, first to an electrical signal indicating displacement, then a high pass filter to remove low frequency components.

The function of high pass filter 11 is to remove low frequency elements in the fiber optic probe signal below 50 Hz. Those elements would arise from the overall gross motion of the probe as it is following the target. The intent is to have the output of 11 contain just the signal elements which arise from the dither of the probe assembly. The dither sensor and electronics are identified by numerals 4, 6 and 10. To enable the error detection system to operate properly, it is necessary to measure the dither motion directly. That is done by adding another fiber optic sensor which is identified by the numeral 4. That is mounted such that it can measure the dither vibration of the probe assembly composed of sensor 1 and lens 2. Component 6 is a standard fiber optic sensor electronics similar to component 7. Component 10 is another high pass filter, the purpose of which is to condition the signal to contain only components resulting from the dither. Component 13 in FIG. 2B is a detector which receives the dither signal which is called the reference and the actual probe signal which is measuring the output of the probe 1 and 2 as it vibrates or dithers with respect to the target. The output of 13 provides an error signal which indicates how far the probe assembly composed of sensor 1 and lens 2 is off null in the optical response curve and it also indicates the direction from the null—either towards the probe or away from probe.

The detected distance signal which is the output of the detector 13 is amplified and phase shifted by the circuit composed of amplifier 15, integrator amplifier 17 and summing amplifier 20. This provides a velocity error signal that sets the value of motor velocity which is needed to drive the axial position slide 30 in a stable manner and maintain the lens to target gap a constant value..Component 14 is a gain adjustment for the proportional gain amplifier 15 and component 16 is gain adjustment for the integrator 17. Numerals 14 and 15 designate an adjustable gain amplifier. Components 16 and 17 provide an adjustable integrating gain amplifier. These are all controls that allow the servo control system operation to be stable as the probe follows the target motion.

The closed loop signal actually passes through member 13 and then through components 14 through 20 and then back to the motor drive. Components 14 through 20 are circuit elements that provide integration and gain and summing. These provide for conditioning the signal to the desired velocity error signal.

Proportional gain adjustment 14 and the integrator gain adjustment 16 are included in the circuit to set the gain and phase-shift values to optimize the band width and slew rate of the servo system.

The integrator reset circuit box 19, is used to reset or zero the integrator when the position control loop is opened with the jog servo-on-switch, number 22. Switch 22 and the jog reference roll 21 are convenience features that are in the system. These all provide means of controlling the motor drive 28 which is a conventional rotational electric motor. The motor 28 is coupled to a gear reducer in one embodiment. It has a 30/1 ratio and a flexible coupling between. The output of the gear reducer drives a lead screw which is connected to a nut which is on the position slide. Motor drive amplifier 27 provides a voltage output which controls the speed and direction of rotation of the motor drive 28 and causes the slide 30 to traverse back and forth. It moves the probe assembly composed of sensor 1 and lens 2 towards or away from the target. The control of the rotational speed of motor 28 is accomplished by the feedback system composed of integrator 23, inverting amplifier 24, velocity control amplifier 25 and the motor drive amplifier 27. The feedback system is close through tachometer 29. The output of the tachometer 29 goes to amplifier 31 which feeds back to components 32 and 33.

Components of the velocity control system are configured to produce a motor speed that will follow the voltage output of the summing amplifier in a stable manner. The output of 20, the summing amplifier, is an error signal. If it goes plus or minus, it creates an output through the path from components 22 through 27 which causes the motor to move and the system senses that movement via the tachometer 29 which provides a signal back into the amplifier 31.

Components 32 and 33 are additional adjustments to set up the servo-loop. These components provide a damping adjustment, and a band width adjustment for the control of the motor velocity. The offset adjustment 36 provides a means of setting the motor speed to zero when there is zero voltage value at the output of the amplifier 20.

There is also provision for limiting the axial motion of the slide to prevent the entire system from travelling to the extreme end of the travel and running into the mechanical limit of slide 30. Travel limit detector 35 derives a signal from sensor 3. This is used to provide a sensor which measures the overall movement of the probe assembly. It could be any kind of displacement sensor such as an LVDI or a capacitance probe. The output of component 3 is fed to signal conditioning electronics to provide a voltage proportional to the displacement that is measured. The sensor electronics are provided in component 34. That output is fed to component 35 in which limits can be set on the voltage which correspond to travel limits of the axial position slide such as making the gain of velocity control amplifier 25 zero for drive signals that will cause motion beyond the travel limit. There are different ways that this can be implemented. It could use only the voltage limits in the detector; it can also have mechanical switches at stop points in the probe such as component 26 or a combination of both. If the mechanical or the voltage limits are exceeded, signals are provided to component 25 the velocity control amplifier to cause the motor to stop moving. Generally, there is then some action required on the part of the operator to come back and through the manual jog capability to reposition the system back into normal operating range.

In operation dither oscillator 8 creates an AC signal typically around 100 Hz which is fed to coil drive amplifier 9 to drive electromagnetic coil 5 which is an electromagnetic device which causes an AC magnetic force which couples to the flexures shown between the probe assembly 1, 2 and the axial position slide 30 causing the probe assembly, 1 and 2 to vibrate about the focus distance point in a direction perpendicular to the target. The fundamental of the vibration is detected when the central point of the dither is no longer the focus distance point upon change in distance between probe and target and through the servo-loop the in focus position of the probe is restored with the required movement for restoration of focus determined to provide an output signal which is a measure of the position of the target with respect to the probe.

A further improvement is included herein wherein a dither is applied to the motor drive which is not the dither on the probe referred to elsewhere.

It is noted that the drive motor, reduction gear and lead screw have friction inherent in them which causes some drag and hysteresis in operation as the motor moves back and forth. This can cause what is known as a deadband in the system response which adversely affects the response of the system. It displays an inherent instability as it tries to home in on a particular null point. It hunts to a degree that is unacceptable. The amplitude of the hunt is greater than the desired accuracy. The solution to this problem as taught herein involves imposing a small amount of dither or oscillation on the motor drive voltage. This is in addition to the dither discussed above. This causes the motor to oscillate or vibrate rotationally and enables it to avoid becoming stuck by static friction and enables the system to average its response and achieve the proper null point. The result is that the stability of the system output is improved to acceptable limits. This is accomplished by an electronic oscillator which produces a 100 Hz AC signal which is applied to the motor drive circuit.

In FIGS. 2A, 2B, dither oscillator 8 provides the dither signal for the original dither drive. That same signal is also provided to velocity control amplifier 25 for the motor drive amplifier 27. In effect, there has been added to the motor drive signal, a 100 Hz AC signal which appears at the output of motor drive amplifier 27 which forces the motor to continuously oscillate.

We claim:

1. A displacement measuring instrument for measuring the displacement of a target including in combination a fiber optic lens assembly, means for maintaining said assembly in spaced relation with said target, a null condition of said assembly in which said lens assembly is in focused space relation with said target, dither means for vibrating said assembly toward and away from said target about the lens null condition along the axis of said assembly, first electronic means for providing a first output voltage proportional to displacement of said assembly from said target, second electronic means cancelling that portion of said first output voltage resulting from displacement due to said dither means and providing a second voltage resulting from displacement due to means other than said dither means, servo means receiving said second output voltage and moving said assembly with respect to said target to achieve said null condition said second output voltage and measurement means measuring The movement of said servo means.

* * * * *